US005756188A

United States Patent [19]

[11] Patent Number: 5,756,188

[45] Date of Patent: May 26, 1998

Reiter et al.

[54] IMAGE-RECEIVING LAMINATE FOR ID CARD STOCK

[75] Inventors: Thomas Carl Reiter, Hilton; Peter P. Soscia, Geneseo; David P. Brust, Rochester, all of N.Y.

[73] Assignee: Eastman Kodak Company, Rochester, N.Y.

[21] Appl. No.: 721,073

[22] Filed: Sep. 26, 1996

[51] Int. Cl.$^6$ .......... B32B 3/00

[52] U.S. Cl. .......... 428/195; 428/219; 428/340; 428/345; 428/355 R; 428/411.1; 428/480; 428/910; 428/913

[58] Field of Search .......... 428/195, 411.1, 428/488.4, 913, 914, 480, 219, 340, 345, 355 R, 910; 503/227

[56] References Cited

U.S. PATENT DOCUMENTS 3,836,414 9/1974 Staats .......... 156/87
4,325,196 4/1982 Gauch et al. .......... 40/2.2
4,971,950 11/1990 Kato et al. .......... 503/227
5,254,524 10/1993 Guittard et al. .......... 503/227
5,314,861 5/1994 Morohoshi et al. .......... 503/227
5,407,893 4/1995 Koshizuka et al. .......... 503/227
5,569,638 10/1996 Shirai et al. .......... 503/227
5,633,116 5/1997 Kapusniak et al. .......... 430/254

*Primary Examiner*—William Krynski
*Attorney, Agent, or Firm*—Harold E. Cole

[57] ABSTRACT

An image-receiving laminate for an identification card stock, the laminate comprising an oriented polymeric film support having an image-receiving layer located on a first outermost surface thereof, the image-receiving layer having an embossed surface, and the second outermost surface of the oriented polymeric film support having a heat- or chemically-activated adhesive thereon.

4 Claims, No Drawings

IMAGE-RECEIVING LAMINATE FOR ID CARD STOCK

This invention relates to an image-receiving laminate for an identification (ID) card stock, such as a laminated polyester ID card stock, having an embossed surface on one side and an adhesive on the other.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to one of the cyan, magenta or yellow signals, and the process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

The use of ID cards has become widespread, especially for driver's licenses, national ID cards, bank and other authority cards, for example. Security is important for such cards, and an important security feature of such cards is the use of a continuous tone color photograph printed in the same layer along with other personal, variable data. This type of information can be rapidly and conveniently placed onto an ID card by use of an electronic camera, a computer, and a computer-controlled digital printer. For example, a video camera or a digital still camera can be used to capture a person's image and a computer can record the corresponding personal, variable data. The image and data can then be printed onto an ID card stock material by a computer-controlled thermal dye transfer printer using the apparatus described in U.S. Pat. No. 4,621,271 referred to above.

The convenience and rapid access of electronically-generated ID cards makes desirable an ID card stock pre-cut to the proper size, readily transportable through a printer, and capable of exiting the printing hardware in the form of a finished card. Off-line lamination after printing and die cutting to size after lamination are undesirable because of the manual labor and time required. A pre-cut ID card which can be printed as is in a thermal printer is known as a "direct printing card".

Poly(vinyl chloride) (PVC) and/or poly(vinyl chloride/acetate), polyesters, polyethylenes and polycarbonates are known for use as ID card materials. PVC-based cards have been the most widely used, but such cards have a short lifetime of only one to two years due to the marginal physical properties of PVC. PVC is also known to readily absorb plasticizers from other objects thereby further degrading its physical properties. Furthermore, PVC-based cards have also shown a tendency to stick to thermal dye-donors during printing at high densities such that on separation from the card, the dye layer of the dye-donor delaminates and sticks to the card.

U.S. patent application Ser. No. 08/688,975, filed Jul. 31, 1996, of Reiter, Soscia and Brust, entitled, "Composite Thermal Dye Transfer Card Stock", the disclosure of which is hereby incorporated by reference, discloses a novel laminated polyester ID card stock. There is a problem with this card structure, however, in that it can be expensive to manufacture.

U.S. Pat. No. 3,836,414 discloses a method for eliminating bubbles in laminates comprising providing a texture in the heat-sealing surface of the laminate film prior to lamination. There is no disclosure in this reference, however, that this technique would be applicable to an image-receiving layer of a thermal transfer element.

U.S. Pat. No. 4,325,196 relates to a multilayer ID card having a relief-like surface. Again, there is no disclosure in this reference that such a surface would be applicable to an image-receiving layer of a thermal transfer element.

U.S. Pat. No. 5,254,524 relates to the use of a textured surface between a donor and receiver element for a laser-induced thermal dye transfer system. However, there is no disclosure in this patent that a textured surface on an image-receiving laminate could be used to make an ID card stock.

It is an object of this invention to provide an image-receiving laminate for an ID card stock. It is another object of this invention to provide an image-receiving laminate which has a textured or embossed surface.

These and other objects are achieved in accordance with this invention which comprises an image-receiving laminate for an identification card stock, the laminate comprising an oriented polymeric film support having an image-receiving layer located on a first outermost surface thereof, the image-receiving layer having an embossed surface, and the second outermost surface of the oriented polymeric film support having a heat- or chemically-activated adhesive thereon.

The use of a matte or embossed surface in the clear outer layers of a composite ID card made by laminating clear sheets of extruded poly(vinyl chloride) (PVC) to a white PVC core is known as a way to prevent depressions and dimples in the card surface. These defects are due to air pockets formed between the smooth surface of the card plastic and the smooth surface of the metal laminating plates used in a platen laminating press using pressure and heat. The matte surface allows air to escape from between the surface of the PVC and the smooth plate during lamination, thereby avoiding formation of air pockets. A glossy surface is restored in the lamination process by the smooth metal plates.

In the present invention, it was unexpected that the thin coated dye-receiving layers on a support, such as PET, for example, could have an embossed surface applied thereto using a roll with a textured surface without causing subsequent imaging defects. For example, it was thought that the layers coated on the receiver component would intermix, leading to a reduced image density or non-uniformity.

An embossed surface may be applied to the image-receiving laminate after oven drying subsequent to coating, using a heated, textured metal roll or stack of rolls. This could be done when the receiver layers are coated or when the heat- or chemically-activated adhesive is subsequently coated over the backing layers. This could also be done subsequent to the coating operations.

When such an image-receiving laminate is used to make an ID card stock, smooth metal plates can be used in the laminating press to produce cards with glossy surfaces. The embossed surface on the image-receiving layer, as described above, allows air to escape from between the plate and the image-receiving surface, resulting in a card stock having a uniform high gloss surface.

The embossed surface of the image-receiving layer can be applied using a roll with a textured surface without causing subsequent imaging defects. The image-receiving layer preferably has a surface roughness average, $R_a$, of at least 1.23 μm.

The oriented polymeric film used in the invention, such as PET, is attached to a polymeric core substrate of an ID card stock by using a heat- or chemically-activated adhesive. The adhesive to be used is dictated by the nature of the layers on the PET side opposite the dye image-receiver side as well as by the material comprising the polymeric core substrate. This adhesive layer can be formed by use of conventional adhesives of the aqueous solution type, emulsion type, solvent type, solvent-less type, solid type, or those in the form of films, tape or webs. The coated adhesive must allow winding and storage of the PET film at moderate temperatures without occurrence of blocking.

An effective adhesive is one which produces a bond of sufficient strength so that cohesive failure occurs within the PET rather than at the adhesive when an attempt is made to rip apart the composite card. In a preferred embodiment of the invention, a terpolymer of vinyl chloride, vinyl acetate and maleic acid is employed.

In such an embodiment, a rectangular sheet of the PET film is placed on each side of a slightly smaller rectangular sheet of the polymeric core material after the adhesive is applied, so that the adhesive is between the polymeric core and the back side of the PET film. The rectangular sheets of the PET films are obtained after coating the adhesive by slitting off a specified amount from each edge of the full width coating, designating one edge as A and the other as B, then slitting the remainder exactly in half in the machine direction of the PET. Rectangular pieces are cut from the slits with the long side corresponding to the long direction of the slit. A composite comprised of rectangular halves of the coated PET film, each half taken from the opposite slit, and the polymeric core substrate are assembled in such a way that the edges A and B of the formerly full width coated PET are superimposed on opposite sides of the polymeric core substrate.

This configuration of the PET slits in the composite promotes flatness of the card stock since areas of the PET support with similar thermal shrinkage behavior are matched on opposite sides of the card. The composite is placed between flat plates, then heat and pressure appropriate for the adhesive are applied for a suitable time. After cooling and removal from the press, the large sheets are cut into strips and fed into a die which cuts cards to the desired dimensions from the strips. The location of die cutting is controlled by sensing black marks pre-printed on the polymeric core material.

ID cards made with the invention do not have depressions and dimples and allows one to achieve a satisfactory gloss level comparable to that for widely used PVC type cards, i.e., the cards have a 60 degree gloss rating of at least about 90.

The ID card structure made with the invention is readily suited to making a pre-cut direct printing card with improved physical properties as compared to PVC-based cards. The ID card stock provides improved flexural durability over an extended period of time vs. PVC, while retaining good stiffness and impact strength. The ID card material can have layers specifically adapted for thermal printing on both front and back sides, if desired. The card also has separate sites on the polymeric core for printing non-varying information using printing methods other than thermal transfer. The invention also allows one to make use of dye-receiving layers which function well with dye-donors designed to give high maximum density at very short line times without the dye-donor sticking problem encountered with prior art ID cards.

Pre-cut ID card stock can be easily produced by conventional methods using the above-described composite film structure in the conventional shape and size, e.g., 54.5 mm×86 mm, and having a thickness of about 0.8 mm. A pre-cut card stock is one which is made to the card size specifications before printing and exits the printer system without any further trimming or cutting required. An overcoat laminate may be applied after printing if desired.

The thickness of both the polymeric core substrate and oriented polymeric film is variable, but the overall thickness is usually in the range of 685 to 838 μm (27–33 mils). The outer surfaces of the ID card stock can be thermally printed with dye images or text. Optionally, non-varying information, such as lines, line segments, dots, letters, characters, logos, guilloches, etc., can be printed on the polymeric core substrate by non-thermal dye transfer methods such as flexo or offset printing before attaching the polymeric core substrate to the oriented polymeric film or films carrying the external dye-receiving layer or layers.

The composite ID card stock made with the invention can also be readily milled for placement of a memory chip. Alternatively, the polymeric core and image-receiving laminate can be pre-punched before laminating for insertion of a memory chip.

The polymeric core substrate employed with the invention can comprise, for example, an amorphous polyester, a biaxially-oriented polyester, poly(vinyl chloride), copolymers of poly(vinyl chloride) with the latter constituting more than 50 mole % of the copolymer, polypropylene, and polypropylene copolymers. In a preferred embodiment, the polymeric core substrate is an amorphous polyester such as EASTAR® PETG 6763, a copolyester from Eastman Chemical Company, that is believed to comprise 16 weight % cyclohexanedimethanol, 34 weight % ethylene glycol, and 50 weight % terephthalic acid, and which has a Tg of 81° C. The polymeric core substrate may also be a composite laminate, such as a laminate of the above materials, if desired. The thickness of the polymeric core substrate can be, for example, from 127 to 787 μm (5–31 mils).

The polymeric core substrate may also include pigments for opacification, such as white pigments, e.g., titanium dioxide, barium sulfate, calcium sulfate, calcium carbonate, zinc oxide, magnesium carbonate, silica, talc, alumina and clay. Suitable pigments may be homogeneous and consist essentially of a single compound such as titanium dioxide or barium sulfate alone. Alternatively, a mixture of materials or compounds can be used along with an additional modifying component such as a soap, surfactant, coupling agent or other modifier to promote or alter the degree to which the pigment is compatible with the substrate polymer.

In general, any pigment employed in the polymeric core substrate has an average particle size of from 0.1 to 1.0 μm, preferably from 0.2 to 0.75 μm. The amount of pigment that is incorporated is generally between about 5% and 50% by weight, preferably about 15 to about 20%, based on the weight of the core polymer.

The polymeric core substrate can be formed by conventional methods such as coating, lamination, co-extrusion and hot-melt extrusion. A preferred method comprises heating a pigmented, amorphous polyester to a temperature above its melting point and continuously melt extruding the material in sheet form through a slot die onto a chilled casting drum on which it solidifies. The amorphous, opaque sheet may then be cooled and rolled. Such pigmented films are available commercially in various thicknesses.

The oriented polymeric film located on at least one, and preferably on both, outermost sides of the ID card stock employing the invention can be, for example, polycarbonates, polyesters such as poly(ethylene naphthalate) and poly(ethylene terephthalate), polyolefins, polyamides, cellulose esters, polystyrene, polysulfonamides, polyethers, polyimides, poly(vinylidene fluoride), polyurethanes, poly(phenylene sulfides), polytetrafluoroethylene, polyacetals, polysulfonates, polyester ionomers, polyolefin ionomers, copolymers and mixtures of the above, etc. In a preferred embodiment of the invention, a synthetic linear polyester is employed. Such a material is well known to those skilled in the art and is obtained by condensing one or more dicarboxylic acids or their lower (up to 6 carbon atoms) diesters, e.g., terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydroterephthalic acid or 2-bis-p-carboxyphenoxyethane (optionally with a monocarboxylic acid, such as pivalic acid), the corresponding dicarboxylic acid dialkyl ester or lower alkyl ester with one or more glycols, e.g., ethylene glycol, 1,3-propanediol, 1,4-butanediol, neopentyl glycol and 1,4-cyclohexanedimethanol. In a preferred embodiment, the polyester polymer is obtained by condensing terephthalic acid or 2,6-naphthalenedicarboxylic acid or their dimethyl esters with ethylene glycol. In another preferred embodiment, the polymer is PET. The PET film prepared from the above-described composition must be oriented. In a preferred embodiment, the PET film is biaxially-oriented. Such a process is described in many patents, such as GB 838,708, the disclosure of which is hereby incorporated by reference. These techniques are well known to those skilled in the art.

The thickness of the oriented polymeric film employed in the invention can be, for example, from 19 μm (0.75 mils) to 178 μm (7 mils).

The oriented polymeric film employed in the invention may employ an undercoat or a primer layer on one or both sides to promote adhesion of subsequently coated layers. Undercoat layers which can be used are described in U.S. Pat. Nos. 2,627,088; 2,698,235; 2,698,240; 2,943,937; 3,143,421; 3,201,249; 3,271,178; and 3,501,301, the disclosures of which are hereby incorporated by reference. A preferred material is poly(acrylonitrile-co-vinylidene chloride-co-acrylic acid).

The oriented polymeric film may also have on one side thereof an antistatic layer to avoid accumulation of static charges during high speed coating of the various layers from organic solvents, and to minimize attachment of dirt which can produce defects in subsequent construction of the ID card stock itself. A preferred material is vanadium pentoxide in poly(acrylonitrile-co-vinylidene chloride-co-acrylic acid) as described in co-pending U.S. application Ser. No. 08/688,884 of Brust, Reiter, and Soscia, filed Jul. 31, 1996, and entitled "Backing Layer For Composite Thermal Dye Transfer ID Card Stock."

Receiving layer polymers employed in the invention include polycarbonates, polyurethanes, polyesters, poly(vinyl chlorides), poly(styrene-co-acrylonitrile), polycaprolactone or any other receiver polymer or mixtures thereof. In a preferred embodiment, the receiving layer is a dye image-receiving layer which comprises a polycarbonate. Preferred polycarbonates include bisphenol-A polycarbonates having a number average molecular weight of at least about 25,000. Examples of such polycarbonates include General Electric LEXAN® Polycarbonate Resin, Bayer AG MACROLON 5700®, and the polycarbonates disclosed in U.S. Pat. No. 4,927,803, the disclosure of which is incorporated by reference.

The dye image-receiving layer employed in the invention may be present in any amount which is effective for its intended purposes. In general, good results have been obtained at a receiver layer concentration of from about 1 to about 10 g/m$^2$.

Between the dye image-receiving layer and the primed polyester film may be placed other layers such as a compliant or "cushion" layer as disclosed in U.S. Pat. No. 4,734,396, the disclosure of which is hereby incorporated by reference. The function of this layer is to reduce dropouts in the printing process caused by dirt and dust.

In another embodiment of the invention, other features normally used in ID cards may be employed, such as signature panels, magnetic stripes, holographic foils, etc. These features are placed on the composite card at appropriate locations.

Dye-donor elements that are used with the ID card dye-receiving element of the invention conventionally comprise a support having thereon a dye-containing layer. Any dye can be used in the dye-donor element employed in the invention provided it is transferable to the dye-receiving layer by the action of heat. Especially good results have been obtained with sublimable dyes. Dye-donor elements applicable for use in the present invention are described, e.g., in U.S. Pat. Nos. 4,916,112; 4,927,803 and 5,023,228, the disclosures of which are hereby incorporated by reference.

Thermal printing heads which can be used to transfer dye from dye-donor elements to the ID card receiving elements employing the invention are available commercially. There can be employed, for example, a Fujitsu Thermal Head FTP-040 MCSOO1, a TDK Thermal Head F415 HH7-1089, Kyocera KBE-57-12MGL2 Thermal Print Head or a Rohm Thermal Head KE 2008-F3. Alternatively, other known sources of energy for thermal dye transfer may be used, such as lasers as described in, for example, GB No. 2,083,726A. Ink-jet or electrophotographic printers may also be used to transfer images to the image-receiving laminate of the invention.

After the card is thermally imaged, a transparent protective layer can be formed on the surface of the image-receiving layer if desired. This can be done by use of a dye-donor element which includes an additional non-dye patch comprising a transferable protection layer as disclosed in U.S. Pat. Nos. 5,332,713 and 5,387,573, the disclosures of which are incorporated by reference. A protective layer applied in this manner provides protection against image deterioration due to exposure to light, common chemicals, such as grease and oil from fingerprints, and plasticizers often found in items made with poly(vinyl chloride) such as wallets.

A clear, protective layer of equal or greater thickness than that applied from the dye-donor may also be applied to the card using a laminator with heat and pressure. Preferably this protective layer is transferred from a carrier film either in-line or off-line from the thermal printer using a hot roll laminator. Protective layer materials employed are clear thermoplastic polymers whose exact composition is dictated by the ability to adhere to the dye image-receiver layer and to provide the desired, specific protective properties. The protective layer must not degrade the image nor affect image stability to heat and light. Such layer may also incorporate other materials, such as ultraviolet light absorbers. The protective layer may also incorporate security devices such as holographic images.

The following examples are provided to further illustrate the invention.

EXAMPLE 1

A composite card stock (designated herein as A-1) was prepared in the following manner:

On both sides of a 178 μm thick, transparent, biaxially-oriented PET film was coated a subbing layer of poly (acrylonitrile-co-vinylidene chloride-co-acrylic acid) (14:79:7 wt. ratio) (0.05 $g/m^2$). On one side of the subbed PET were coated the following layers:

1) a compliant layer of a mixture of poly(n-butyl acrylate-co-acrylic acid) (50:50 wt. ratio) (8.1 $g/m^2$), 1,4-butanediol diglycidyl ether (0.57 $g/m^2$), tributylamine (0.32 $g/m^2$), and Fluorad® FC-431 perfluoroamido surfactant (3M Corp.) (0.016 $g/m^2$) from acetone/water solvent;
2) a subbing layer of a mixture of poly(acrylonitrile-co-vinylidene chloride-co-acrylic acid) (14:79:7 wt. ratio) (0.54 $g/m^2$), and DC-1248 surfactant (0.016 $g/m^2$) (Dow Corning Corp.) coated from methyl ethyl ketone;
3) a dye image-receiving layer of a mixture of Makrolon® KL3-1013 polycarbonate, (Bayer AG), (1.78 $g/m^2$), Lexan® 141-112 poly-carbonate (General Electric) (1.45 $g/m^2$), dibutyl phthalate, (0.32 $g/m^2$), diphenyl phthalate, (0.32 $g/m^2$), and Fluorad ® FC-431 (0.01 1$g/m^2$) dissolved in methylene chloride; and
4) an overcoat layer comprising a mixture of a random terpolymer polycarbonate (50 mole % bisphenol A, 49 mole % diethylene glycol, and 1 mole % 2,500 m.w. polydimethylsiloxane block units) (0.22 $g/m^2$), Fluorad® FC-431 and Dow-Corning 510 Silicone Fluid (a mixture of dimethyl and methyl phenyl siloxanes) (0.005 $g/m^2$) dissolved in methylene chloride.

On the opposite side of the PET film was coated an antistatic material on the subbing layer. This antistatic layer is the subject of copending U.S. application Ser. No. 08/688,884 of Brust, Reiter and Soscia, referred to above, and comprised vanadium pentoxide in poly(acrylonitrile-co-vinylidene chloride-co-acrylic acid).

Over the antistatic layer was applied a protective coating of Elvacite® 2041 (poly(methyl methacrylate) from DuPont Co.) (1.08 $g/m^2$), matte beads (3–4 μm) of poly(methyl methacrylate-co-ethylene glycol methacrylate) (0.025 $g/m^2$), Fluorad® FC-431 coated from methylene chloride.

Over the protective coating was applied a heat- and pressure-activated, thermoplastic resin-type adhesive of a terpolymer of vinyl chloride, vinyl acetate and maleic acid (4.1 $g/m^2$) coated from solvent. The adhesive layer was then dried. After drying, the laminate was contacted with a textured roll to impart an embossed surface on the image-receiving layer.

A wide coating of the PET film described above was trimmed at the edges and the edges were marked as A and B. The coating was then slit up along its center in the machine direction into two slits each (610 mm ) in width. Rectangular pieces were then cut (826 mm) in length from the slits, keeping those pieces having edge A separate from those having edge B.

A piece of the PET film bearing edge A was placed with the adhesive side down on a piece of white, pigmented, amorphous polyester core slightly smaller in size and about 356 μm thick. The amorphous polyester was EASTAR® PETG 6763 (Eastman Chemical Co.). The white pigment in the polyester core was $TiO_2$. A piece of the PET film bearing edge B was placed on the opposite side of the polyester core, with the adhesive side in contact with the polyester core, and edge B was placed so that edge A was superimposed over it. The white polyester sheet was printed before forming the composite to provide marks for controlling the die cutting of the cards from the glued composite.

The composite and smooth metal plates enclosing the composite were placed into a platen press, then heat (about 110° C.) and pressure (about 17 bar) were applied for about 18 minutes, followed by cooling. After gluing, the composite was slit lengthwise and the strips were cut in a die to produce ID cards ready for thermal printing. The cards were each made to be 54.5 mm×86 mm and about 737 μm thick following the standard described in ISO/IEC 7810, 2nd Edition, 1995-08-15.

The cards produced exhibited a gloss typical of what is found on PVC cards used commercially. Table 1 shows the 60 degree gloss of the cards measured with a Gardener Multi-Angle Digital Glossgard Meter according to ASTM Standard Test Method for Specular Gloss (D-523-89). These cards were also inspected for surface depressions and dimples. None were found.

A PVC type card reflective of identification materials used commercially (Sillcocks Corp.) was used as a control, C-1, to define the gloss level found on commercial ID cards.

TABLE 1

| CARD | PROCESS | SURFACE | 60 DEGREE GLOSS |
|---|---|---|---|
| A-1 | Made with smooth plates | glossy | 97.4 |
| C-1 | PVC Commercial | glossy | 93.6 |

The data in Table 1 show that an ID card stock using the image-receiving laminate of the invention has a gloss like that of a commercial ID card.

EXAMPLE 2

The following dyes were used in preparing the dye-donor element used in the experimental work:

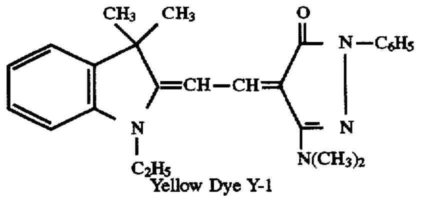

Yellow Dye Y-1

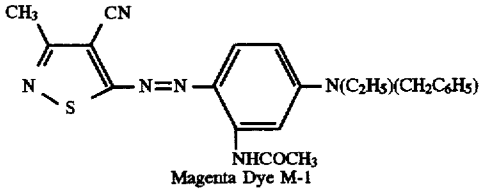

Magenta Dye M-1

-continued

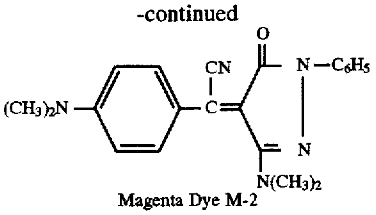

Magenta Dye M-2

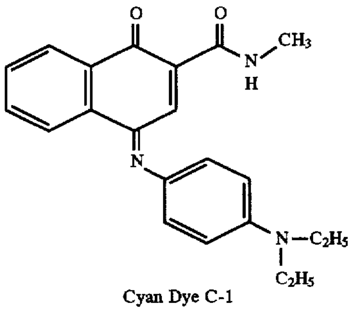

Cyan Dye C-1

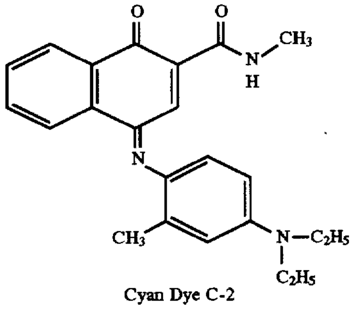

Cyan Dye C-2

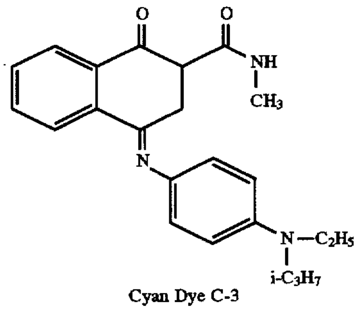

Cyan Dye C-3

A dye-donor element of sequential areas of yellow, magenta and cyan dyes was prepared by coating the following layers, in order, on one side of a 6 μm PET support:

1) a subbing layer of Tyzor® TBT titanium tetra-n-butoxide, (DuPont Corp.) (0.12 g/m$^2$) from a n-propyl acetate and 1-butanol solvent mixture;
2) a dye layer containing sequential, repeating areas of yellow, magenta and cyan dyes as follows:
   a) a yellow area comprising a mixture of yellow dye Y-1 (0.268 g/m$^2$), cellulose acetate propionate (0.359 g/m$^2$), poly (divinyl-benzene) 2 μm beads (0.006 g/m$^2$) and Fluorad® FC-430 surfactant (3M Corp.) (0.002 g/m$^2$) coated from a mixture of toluene, methanol and cyclo-pentanone;
   b) a magenta area comprising a mixture of magenta dye M-1 ( 0.169 g/m$^2$), magenta dye M-2 (0.184 g/m$^2$), cellulose acetate propionate (0.308 g/m$^2$),2,3-dihydro-1,1,3-trimethyl-N-(2,4,6-trimethyl-phenyl-3-(4((2,4,6-trimethyl-phenyl)amino)carbonyl)-phenyl)-1H-indene-5-carboxamide (0.065 g/m$^2$), poly (divinylbenzene) 2 μm beads (0.006 g/m$^2$) and Fluorad® FC-430 (0.001 g/m$^2$) from a mixture of toluene, methanol and cyclopentanone;
   c) a cyan area comprising a mixture of cyan dye C-1 (0.129 g/m$^2$), cyan dye C-2 (0.117 g/m$^2$), cyan dye C-3 (0.279 g/m$^2$), cellulose acetate propionate (0.299 g/m$^2$), poly(divinyl-benzene) 2 μm beads (0.011 g/m$^2$) and Fluorad® FC-430 (0.0005 g/m$^2$) coated from a mixture of toluene, methanol and cyclopentanone.

On the other side of the dye-donor element were coated the same subbing layer as used on the dye side and a slipping layer of KS-I (a poly(vinyl acetal) from Sekisui Chemical Co.) (0.379 g/m$^2$), PS-513 (an aminopropyl dimethyl-terminated polydimethylsiloxane from United Chemical Technologies, Inc.)(0.011g/m$^2$), p-toluenesulfonic acid (0.0003 g/m$^2$) and candelilla wax particles (Strahl and Pitsch) (0.022 g/m$^2$) coated from diethyl ketone.

A card was fabricated as in Example 1 except the surface dye-receiving layer was not given an embossed surface before the lamination step in which metal laminating plates with a smooth surface were used. Inspection showed the presence of several depressions or dimples in the card surface varying in size. This card is designated as B-1.

It was printed with stepped neutral channels using a dye-donor as described above using an Edicon (a Kodak Company) 300 SN thermal dye transfer ID card printer. The depressions appeared as white spots indicating lack of contact between the dye-donor and the receiving layers of the card. The Status A neutral density of a step containing a dimple was read and compared to the corresponding step for a printed card of the invention. See Table 2 below for the comparison data.

TABLE 2

| CARD | Image-Receiving Surface | Depression in Card Surface | Status A Neutral Density |
|---|---|---|---|
| A-1 | Embossed | NO | 1.44 |
| B-1 | Not Embossed | YES | 0.33 (white spot in step) |

Table 2 shows that cards made without using the invention had depressions in the surface which drastically interfered with thermal dye transfer printing of the card. The card made using the invention had no depressions in the surface and had a much higher density.

The invention has been described in detail with particular reference to preferred embodiments thereof, but it will be understood that variations and modifications can be effected within the spirit and scope of the invention.

What is claimed is:

1. An image-receiving laminate for an identification card stock, said laminate comprising an oriented polymeric film support having an image-receiving layer located on a first outermost surface thereof, said image-receiving layer being coated at about 1 to about 10 g/m$^2$ and having an embossed surface having a surface roughness average of at least 1.23 μm, and the second outermost surface of said oriented polymeric film support having a heat- or chemically-activated adhesive thereon, said laminate being capable of being applied to a core substrate to produce an ID card stock having a uniform high gloss surface.

2. The image-receiving laminate of claim 1 wherein said adhesive comprises a terpolymer of vinyl chloride, vinyl acetate and maleic acid.

3. The image-receiving laminate of claim 1 wherein said oriented polymeric film is biaxially-oriented poly(ethylene terephthalate).

4. The image-receiving laminate of claim 1 wherein said image-receiving layer has an overcoat layer thereon.

* * * * *